March 23, 1971   C. L. SPORCK   3,572,145
VARIABLE SPEED MECHANISM
Filed Oct. 8, 1969   3 Sheets-Sheet 2
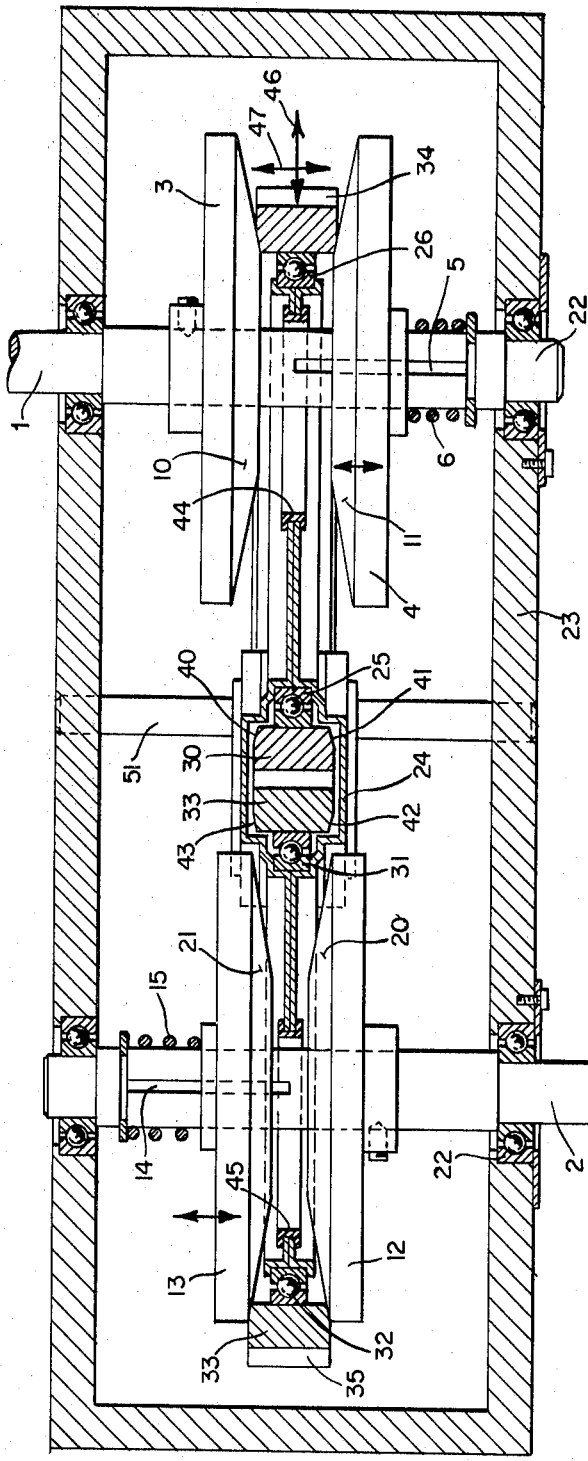
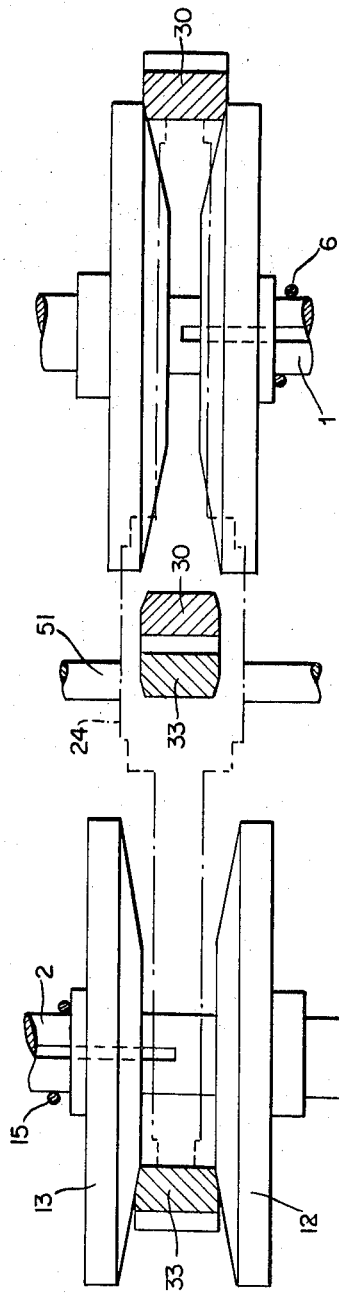
INVENTOR.
CLAUS L. SPORCK
BY
Frederick J. Olsson
ATTORNEY.

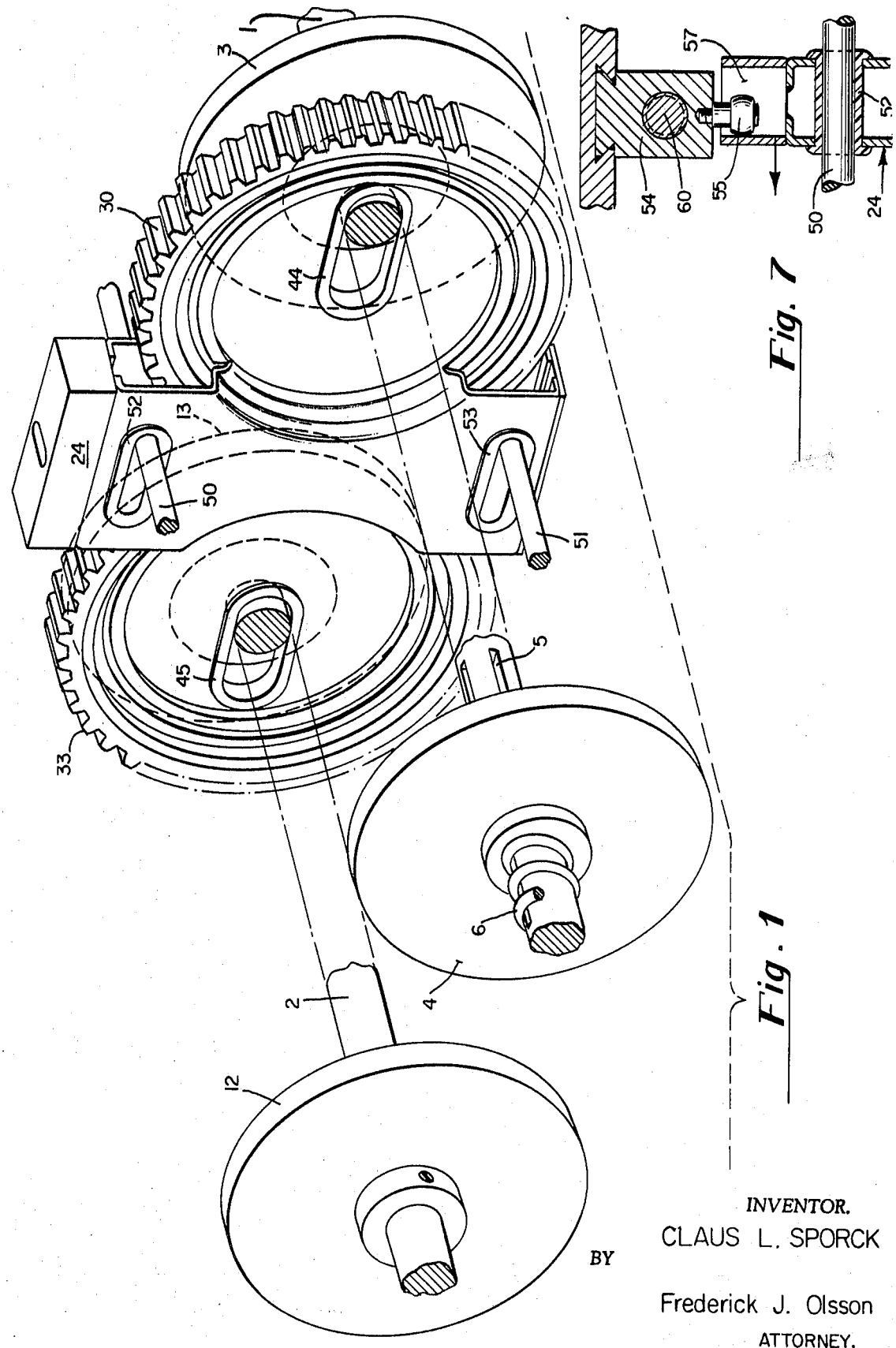

March 23, 1971  C. L. SPORCK  3,572,145

VARIABLE SPEED MECHANISM

Filed Oct. 8, 1969  3 Sheets-Sheet 3

INVENTOR.
CLAUS L. SPORCK
BY
Frederick J. Olsson
ATTORNEY.

United States Patent Office 3,572,145
Patented Mar. 23, 1971

3,572,145
VARIABLE SPEED MECHANISM
Claus L. Sporck, Traverse City, Mich., assignor to
Hitco, Gardena, Calif.
Filed Oct. 8, 1969, Ser. No. 864,760
Int. Cl. F16h *15/42, 55/52*
U.S. Cl. 74—192
6 Claims

ABSTRACT OF THE DISCLOSURE

Mechanism for changing the speed of rotation of an output shaft relative to an input shaft in which a pair of torque transmitting rings are mounted on a carriage and interengaged for rotation about fixed axes, one ring being in frictional contact with an expansible pulley on the input shaft and the other ring being in frictional contact with an expansible pulley on the output shaft, the change in speed being obtained by that carriage is shiftable to move the rings radially of the pulleys to shift the points of contact with respect to the centers of rotation of the pulleys.

---

This invention relates to power transmission mechanism and more particularly to an improved variable speed mechanism wherein the delivered speed is progressively variable relative to the driving speed throughout an extended range.

One object of the invention is to provide an improved variable speed mechanism of the friction type characterized by structure permitting the mechanism to be immersed in oil so that all moving parts are bathed while operating whereby to obtain less wear, less noise, longer life and reduced maintenance.

Another object of the invention is to provide an improved variable speed mechanism of the friction type characterized by structure providing a positive drive between input and output over a wide range of speeds without great bulk and weight.

Another object of the invention is to provide an improved variable speed mechanism of the friction type characterized by structure which permits a maximum of variation of speed between input and output members and which is easily operated, relatively quiet and not likely to get out of order.

Another object of the invention is to provide an improved variable speed mechanism of the friction type characterized by structure which will ensure maximum rigidity of the speed transmission parts when in use and thereby minimize slippage in the drive.

Another object of the invention is to provide an improved variable speed mechanism of the friction type characterized by interengaging rings forming speed-varying driving connections in between the input and output shafts which enhance and attain the proper frictional relation ship by reducing slip and maximizing rolling friction.

Another object of the invention is to provide an improved variable speed mechanism of the friction type characterized by structure for effecting change of speed in a smooth, stepless manner while the transmission is running.

The invention will be described below in connection with the following drawings wherein:

FIG. 1 is an exploded view showing the structure and the general positional relationship of certain parts of the invention.

FIG. 2 is a plan view partially in section showing the components in one speed control relationship.

FIG. 3 is a plan view showing certain of the components in a different driving relationship.

FIG. 7 is a fragmentary view taken along the lines 7—7 of FIG. 4.

Figure 4:
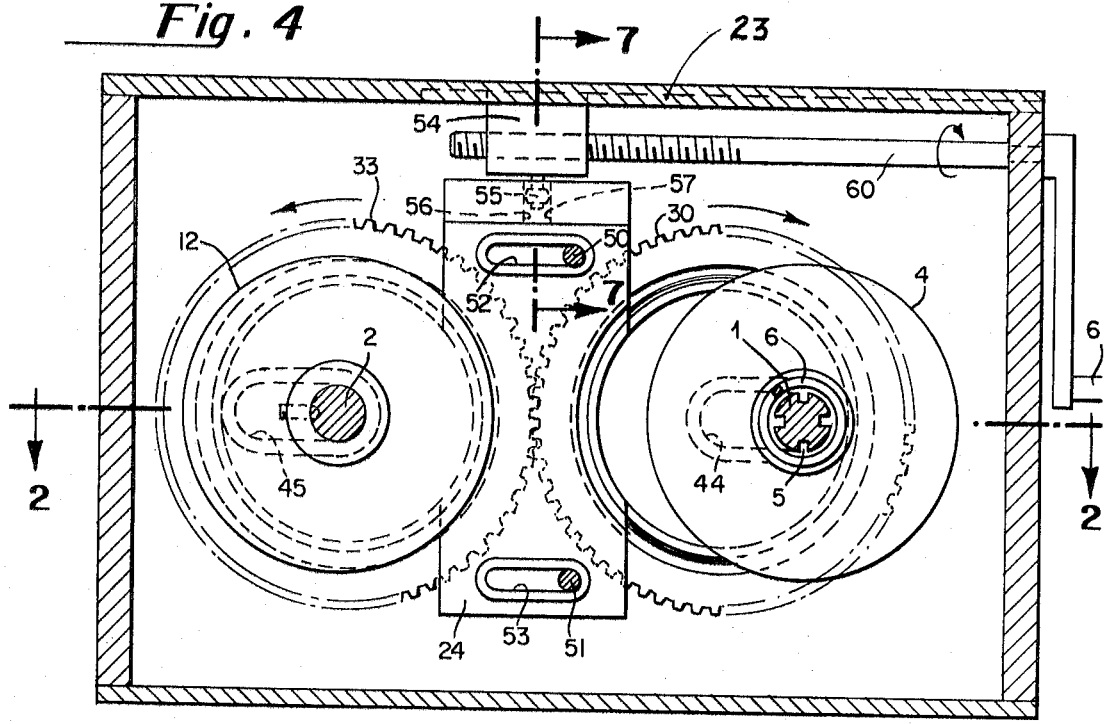
FIG. 4 is a sectional elevational view on a reduced scale of the parts of FIG. 2 and illustrating the driving rings as in direct mesh.

In FIG. 1 the input or driving shaft 1 is adapted to be connected to a member not shown which will rotate the shaft at some desired constant speed. The output or driven shaft 2 is adapted to be connected to mechanism not shown to rotate the same at different settable speeds. The mechanism interconnecting the shafts 1 and 2 determines the rotational speed of the shaft 2 with respect to the shaft 1.

With reference to FIGS. 1 and 2 the shaft 1 mounts a pair of input drive discs 3 and 4. The disc 3 is fixed on the shaft while the disc 4 has a spline connection 5 with the shaft providing for axial motion of the disc. The spring 6 biases the disc 4 toward the disc 3. The discs are provided with tapered drive surfaces 10 and 11 which face one another.

Shaft 2 mounts a pair of output drive discs 12 and 13. The disc 12 being fixed on the shaft while the disc 13 makes a spline connection 14 providing for axial motion. The spring 15 biases the disc 13 toward the disc 12. The discs 12 and 13 have tapered driving surfaces 20 and 21 which face one another.

The shafts 1 and 2 are rotatably mounted on suitable bearings 22 in the housing 23.

A carriage 24 has a pair of bearings 25 and 26 which rotatably mount an input driving ring 30. The carriage 24 also monuts a pair of bearings 31 and 32 which rotatably support an output driving ring 33.

The outer periphery of the input ring 30 is provided with gear teeth 34 while the outer periphery of the output ring 33 is provided with gear teeth 35. As indicated, the gear teeth 34 and 35 are meshed.

The input ring 30 has a pair of driving surfaces 40 and 41 which respectively engage the driving surfaces 10 and 11 on the input discs. The output ring 33 has a pair of driving surfaces 42 and 43 which respectively engage the surfaces 20 and 21 on the output discs.

The driving surfaces on the rigns 30 and 33 are in tight frictional contact with the driving surfaces on the discs 3, 4, 12 and 13 by virtue of the biasing forces provided by the springs 6 and 15. The annular driving surfaces on the rings and discs provide that the frictional engagement be of the rolling rather than the sliding type.

The carriage is provided with a pair of apertures 44 and 45 which respectively accommodate the shafts 1 and 2.

The carriage 24 is mounted for motion in a plane in two directions which are substantially 90° toward one another. For example, as indicated by the 90° arrows 46 and 47 in FIG. 2. The carriage is mounted for such motion as by guide rods 50 and 51 (which are suitably supported by the housing 23) and extend through the nylon bearings 52 and 53 in the carriage. The bearing slidably mount the carriage on the rods so that it can move in the directions mentioned.

A nut 54 slidably supported on the housing 23 has a roller-type follower 55 adapted to engage the cam surfaces 56 and 57 formed on the top of the carriage. By suitably rotating the threaded shaft 60 (through handle 61), the nut 54 causes the follower 55 to engage the surface 56 and move the carriage to the left as viewed in FIG. 4 or engage the surface 57 and move the carriage to the right as viewed in FIG. 4. This is the direction of motion indicated by arrows 46 in FIG. 2.

When the carriage is moved all the way to the left (as viewed in FIG. 4) the rings 30 and 33 will occupy the position as shown in FIG. 2. When the carriage is moved all the way to the right (as viewed in FIG. 4) the rings occupy the position as shown in FIG. 3.

The motion of the carriage in the direction of the arrows 47 is caused by the biasing effect of the springs 6 and 15 on the discs 4 and 13. For example, if the carriage is moved from the position of FIG. 2, in the direction of arrow 46, the disc 4 by pushing hard on the ring 30 causes the surface 40 of the ring to follow up and out along the tapered surface 10 of the disc 3. Also, the disc 13 yields and permits the surface 42 on the ring 33 to move down along the surface 20.

From the foregoing description, it will be apparent that the shifting of the carriage and the shifting of the rings will vary the point of contact of the rings with the discs relative to the rotational axes of the shafts. By this means the speed of the shaft 2 can be varied relative to the speed of the shaft 1.

The position of the parts as shown in FIG. 2, the speed of the output shaft 2 is less than the speed of the output shaft 2. Since the ring 33 is at the outermost point of contact, this will be the slowest speed of the shaft 2 with respect to the shaft 1.

With the parts arranged as shown in FIG. 3 the speed of the output shaft 2 will be greater than that of the shaft 1. Since the contact point of the ring 33 is at its innermost position this will be the greatest speed of the shaft 2 with respect to the shaft 1.

By varying the radial positions of the rings intermediate the positions shown in FIGS. 2 and 3, the speed of the shaft 2 with respect to shaft 1 can be infinitely changed.

Figure 5:
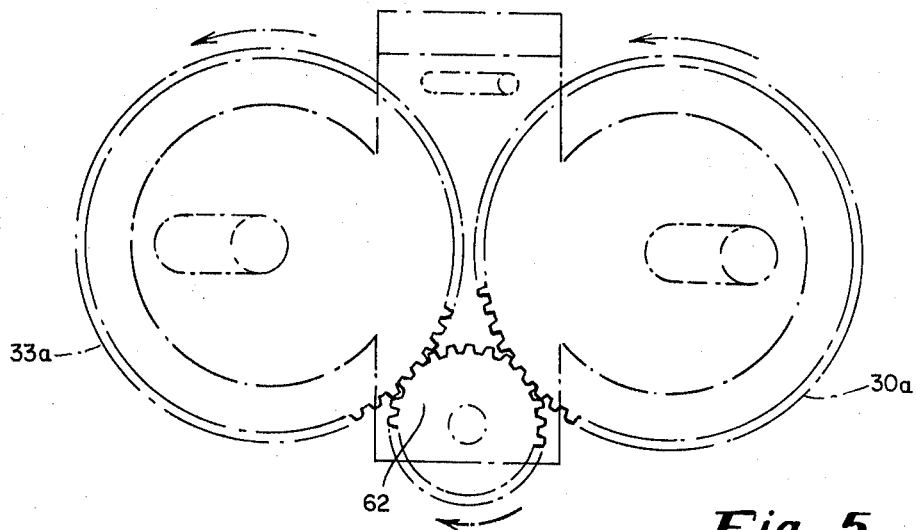
FIG. 5 is an elevational view similar to FIG. 4 with the driving rings being interconnected by a pinion.
Figure 6:
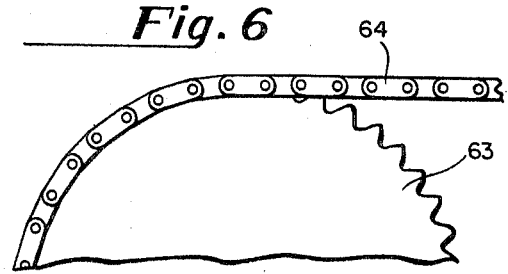
FIG. 6 is a fragmentary view illustrating the use of a timing chain to interconnect the driving rings.

In the arrangement as described above, the rings 30 and 33 being meshed rotate in opposite directions. In instances where the rings should rotate in the same direction, the arrangements of FIG. 5 can be used. In FIG. 5 the rings 30a and 33a are interconected by a pinion 62 so that they rotate in the same direction. Alternatively, the rings can be provided with sprockets 63 such as shown in FIG. 6 and an endless chain 64 connected to the same.

It will be readily apparent to those skilled in the art that the structure of the parts of the invention and the manner in which they cooperate provide for the parts to be metal or made from other oil impervious material. Thus, the parts are adaptable for immersion in oil. The invention contemplates that the housing 23 be provided with suitable oil seals so that the interior of the same can be filled with oil and the parts run under immersed conditions.

I claim:

1. Variable speed mechanism comprising:
    an input shaft and an output shaft;
    a carriage rotatably mounting an input ring and an output ring interengaged for rotation about fixed axes;
    an expansible input pulley on the input shaft in frictional contact with said input ring;
    an expansible output pulley on the output shaft in frictional contact with said output ring; and
    means for moving the carriage to vary the point of contact of the input pulley and the input ring with respect to the rotational axes of the input shaft while simultaneously, inversely varying the point of contact of the output pulley and the output ring with respect to the rotational axes of the output shaft whereby to vary the speed of the output shaft with respect to the input shaft.

2. Variable speed mechanism comprising:
    a carriage;
    means suppoorting the carriage for linear motion in a plane in two directions at 90° to one another;
    an input ring and an output ring rotatably mounted on said carriage for rotation about spaced apart, fixed axes;
    means interconnecting the rings for rotation in unison;
    means on each ring forming a pair of tapered driving surfaces;
    a rotatable input shaft and a rotatable output shaft;
    a pair of input discs respectively mounted on the input shaft for rotation therewith, one of the discs being mounted on the input shaft for axial movement therealong;
    means biasing said one axially movable input disc toward the other disc;
    means on each input disc forming a tapered driving surface and the surfaces on the two input discs facing one another and respectively being in frictional contact with the driving surfaces of the input ring, said biasing means maintaining said contact;
    a pair of output discs respectively mounted on said output shaft for rotation therewith, one of the discs being mounted on the shaft for axial movement therealong;
    means biasing said one axially output disc toward the other disc;
    means on each output disc forming a tapered driving surface and the surfaces on the two output discs facing one another and respectively being in frictional contact with the driving surface of the output ring and last said biasing means maintaining said contact;
    means for moving the carriage to vary the point of contact of the input discs and the input ring with respect to the rotational axes of the input shaft while simultaneously, inversely varying the point of contact of the output discs and the output ring with respect to the rotational axes of the output shaft whereby to vary the speed of the output shaft with respect to the input shaft.

3. A construction in accordance with claim 2 wherein:
    said means interconnecting the rings for rotation comprises meshing gear teeth respectively on the periphery of each ring.

4. A construction in accordance with claim 2 wherein:
    said means interconnecting the rings for rotation comprises gear teeth respectively on the periphery of each ring and a pinion engaged with the teeth.

5. A construction in accordance with claim 2 wherein:
    said means interconnecting the rings for rotation comprises sprockets formed on the periphery of each ring and an endless chain engaged with the sprockets.

6. A construction in accordance with claim 2 further including:
    a housing means rotatably mounting the input and output shafts;
    a pair of apertures formed on said carriage through which respectively extend the input and output shafts;
    at least a pair of guide pins on the housing extending parallel said shafts;
    aperatures formed on said carriage through which extend the guide pins, the carriage being supported and guided by the pins.

References Cited

UNITED STATES PATENTS

| 2,330,136 | 9/1943 | Nardone | 74—230.17(A)X |
| 2,432,442 | 12/1947 | Pourtier | 74—192 |
| 2,611,276 | 9/1952 | Heynau | 74—192 |
| 3,188,875 | 6/1965 | Stieber et al. | 74—192 |
| 3,440,893 | 4/1969 | Heynau | 74—192 |

LEONARD H. GERIN, Primary Examiner

U.S. Cl. X.R.

74—217, 230.17